April 1, 1969  H. O. BIXBY  3,436,476
PYROGRAPHIC TYPE TELAUTOGRAPHIC RECORDER
Filed March 8, 1967  Sheet 1 of 3

INVENTOR.
HAROLD O. BIXBY
BY Kenway Jenney
& Hildreth
ATTORNEYS

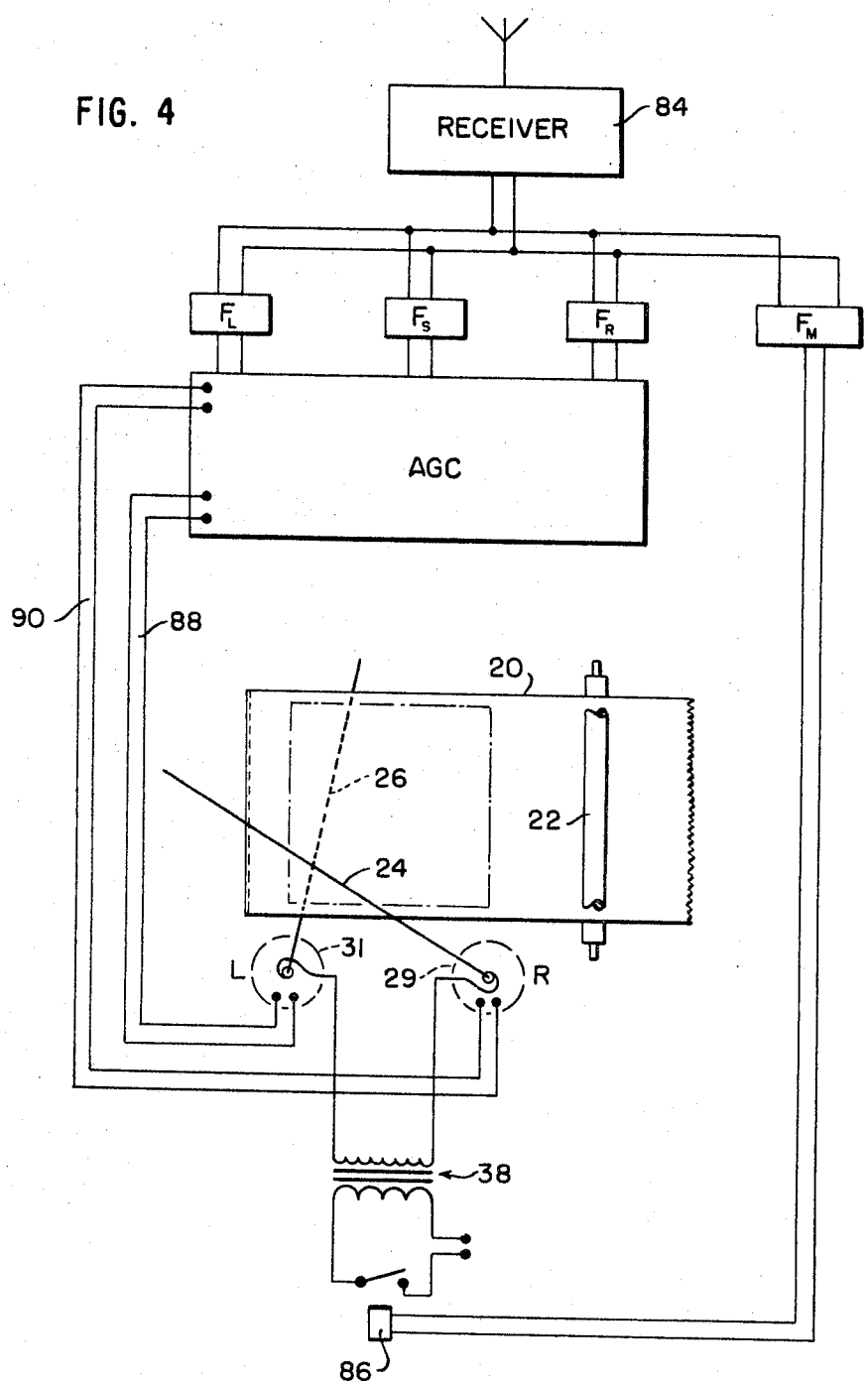

United States Patent Office 3,436,476
Patented Apr. 1, 1969

3,436,476
PYROGRAPHIC TYPE TELAUTOGRAPHIC
RECORDER
Harold O. Bixby, 100 Memorial Drive,
Cambridge, Mass. 02139
Filed Mar. 8, 1967, Ser. No. 621,584
Int. Cl. G08b 5/00, 5/22
U.S. Cl. 178—18           10 Claims

ABSTRACT OF THE DISCLOSURE

A graphical recorder having a recording surface with electrodes above and below the recording surface, each electrode comprising a fine tension wire movable by a meter of the galvanometer type. Marking of the recording is accomplished by an electrical discharge between the wires. Radio transmitting and receiving equipment for operating the recorder are described.

Background of the invention

Devices for transmitting and receiving handwriting, manual printing, sketches and other graphical representations have long been known under the term "Telautograph." In such a device a stylus at the transmitter controls a sending circuit through suitable linkages, while similar linkages at the receiver operate a pen to record a facsimile of the transmitted information. One of the principal disadvantages of this type of equipment is that the field of view at the receiver is obscured by the linkages and the recording pen. The recorded information is not completely visible until the record is removed from the receiver, and hence is not useful when continuous viewing of the recording area during the process of making the record is necessary, as for example, in the graphical transmission of navigational information to an aircraft.

Summary of the invention

The principal object of the present invention is to provide a graphical recorder in which the field of view is completely visible, so that the view of the recording is in no way obscured even while the recording operation is in progress.

To this end the principal feature of the present invention comprises the use of electrodes of small transverse dimensions, such as long thin wires, which may be moved above and below the recording medium, together with electrical means for marking the recording medium at the point where the projections of the wires on the medium intersect. The actual marking is accomplished by means of passing an electrical spark through the recording medium, which is heat-sensitive.

Another object of the invention is to provide a graphical recorder giving two-dimensional recordings which operates on minute amounts of electrical power, such as the output of a transistorized radio receiver.

Brief description of the drawing

FIG. 4 is a schematic diagram of the circuits for the recording apparatus of the invention.

Description of the preferred embodiment

Figure 1:
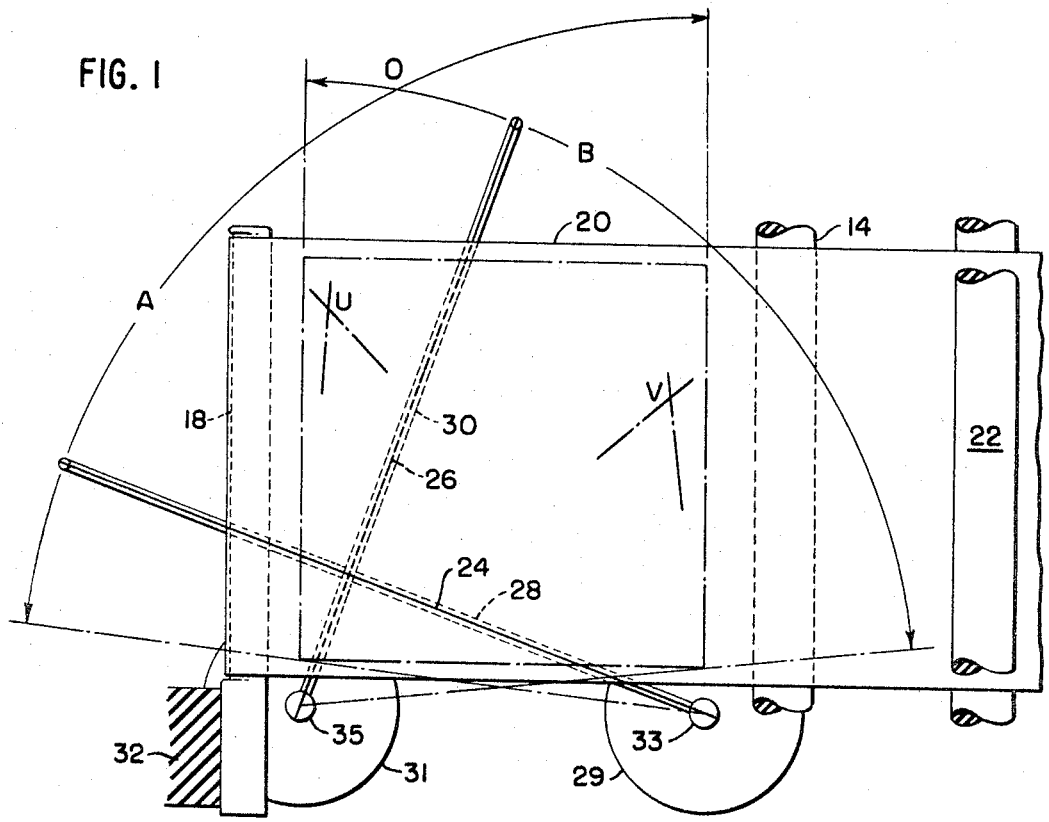
FIG. 1 is a plan view of a recording apparatus according to the present invention.

In the illustrated embodiment of the invention (FIGS. 1 and 2), a supply spool 10 holds a roll 12 of a suitable sheet recording medium, which will be referred to herein as paper, although it may comprise treated cloth or plastic. The characteristics of the paper for the purposes of the invention will be described more fully later. From the spool 10 the paper leads over a guide roll 14 and thence it extends in a flat lower stretch 16 to the bottom of a direction-reversing guide 18, from which it turns back to form a plane upper stretch 20 directly above the lower stretch 16. The flat upper stretch forms the recording surface.

The paper then passes through feed rolls 22 by which it may be intermittently advanced to present fresh writing surfaces. From the feed rolls the paper may pass to any suitable tearing-off edge, basket, take-up roll or other collecting device.

The marking system comprises two electrodes of light weight, one electrode 24 lying slightly above but out of contact with the recording surface 20 of the paper, and the other 26 slightly below and also out of contact with the recording surface. Both electrodes are preferably of tensioned wire, and they are mounted and supported at their ends in spring bows. Thus the upper electrode 24 comprises a length of fine wire having its outer end secured in a spring bow 28, while the lower electrode wire is tensioned in a bow 30.

The bow 28 carrying the upper wire is mounted to be rotated through about a 90° arc by an electric meter unit 29 of the D'Arsonval type, in which the wire 24 is the equivalent to the indicating "needle." The meter unit 29 is located adjacent to the lower right corner of the recording surface as viewed in FIG. 1. Similarly, the bow 30 carrying the lower wire is mounted to be rotated through about a 90° angle by a meter unit 31, similar to the instrument 29, located near the lower left corner of the recording surface.

As will presently be described in more detail, the paper is marked by a spark or arc discharge at the point where the projections of the wires on the paper intersect. This intersection may occur at any point on the recording surface and accordingly it is necessary that each wire be somewhat longer than the diagonal of the recording area.

The bow 30 carrying the lower wire is placed between the upper and lower stretches of the paper. In order that the view of the paper may not be obscured by anything more than the upper wire 24, a feature of the invention contemplates that the bow 30 lie mainly below the lower stretch 16 of the paper. By constructing the bow deep enough and making the wire and bow long enough it is possible to avoid any interference with the guide-reverser 18, which must be supported by a single cantilever support 32 near the lower left corner of the recording surface. Under proper operating conditions there is no possibility of interference between the ends of the two bows. As shown in FIG. 1, the end of the upper wire 24 swings over the arc A, while the end of the lower wire 26 swings over the arc B. The two arcs intersect at 0. If the end of the lower wire 26 is at any point to the right of 0 the upper wire 24 may move to any position without interference. But if the wires initially intersected at (say) U, and if the incoming signals required them to take a new position intersecting at V, the motions could not be completed if the upper wire first moved to its new position. Such an action, however, would require that during the transition the intersection would run off the recording area at some point. The invention contemplates that the transmitting device be constrained within the confines of a platen at the transmitter similar to that of the recording area at the receiver, and therefore the signals at the receiver will necessarily operate the meters in a manner to confine the point of intersection to the recording area and avoid the possibility of interference between the bows and wires.

Figure 2:
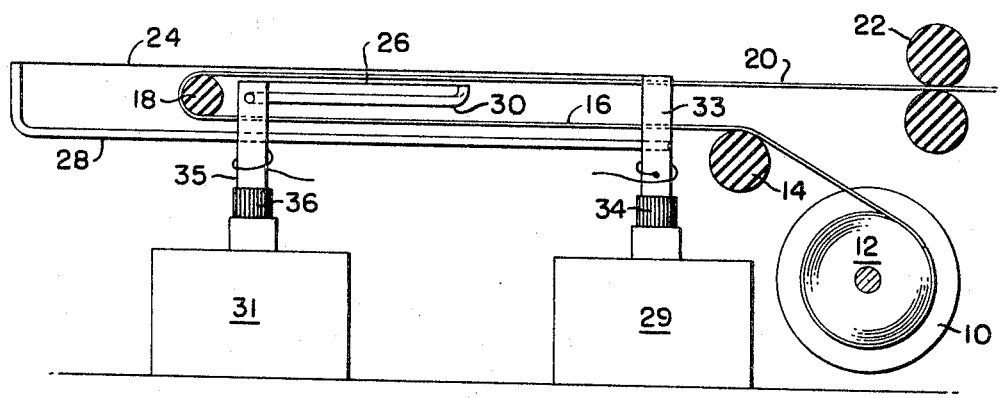
FIG. 2 is a sectional elevation of the apparatus of FIG. 1.

As shown in FIG. 2 the inner end of the bow 28 for the upper wire 24 is mounted on a stud 33 connected to the shaft of the meter 29 by an insulating connector 34, and the inner end of the bow 30 is mounted on a stud 35 connected to the shaft of the meter 31 by an insulating connector 36. As shown in FIG. 4, a high-voltage spark generator 38 is connected to the studs 33 and 35. When the generator 38 is energized, a spark jumps between the wires 24 and 26 at their projected intersection.

Figure 3:
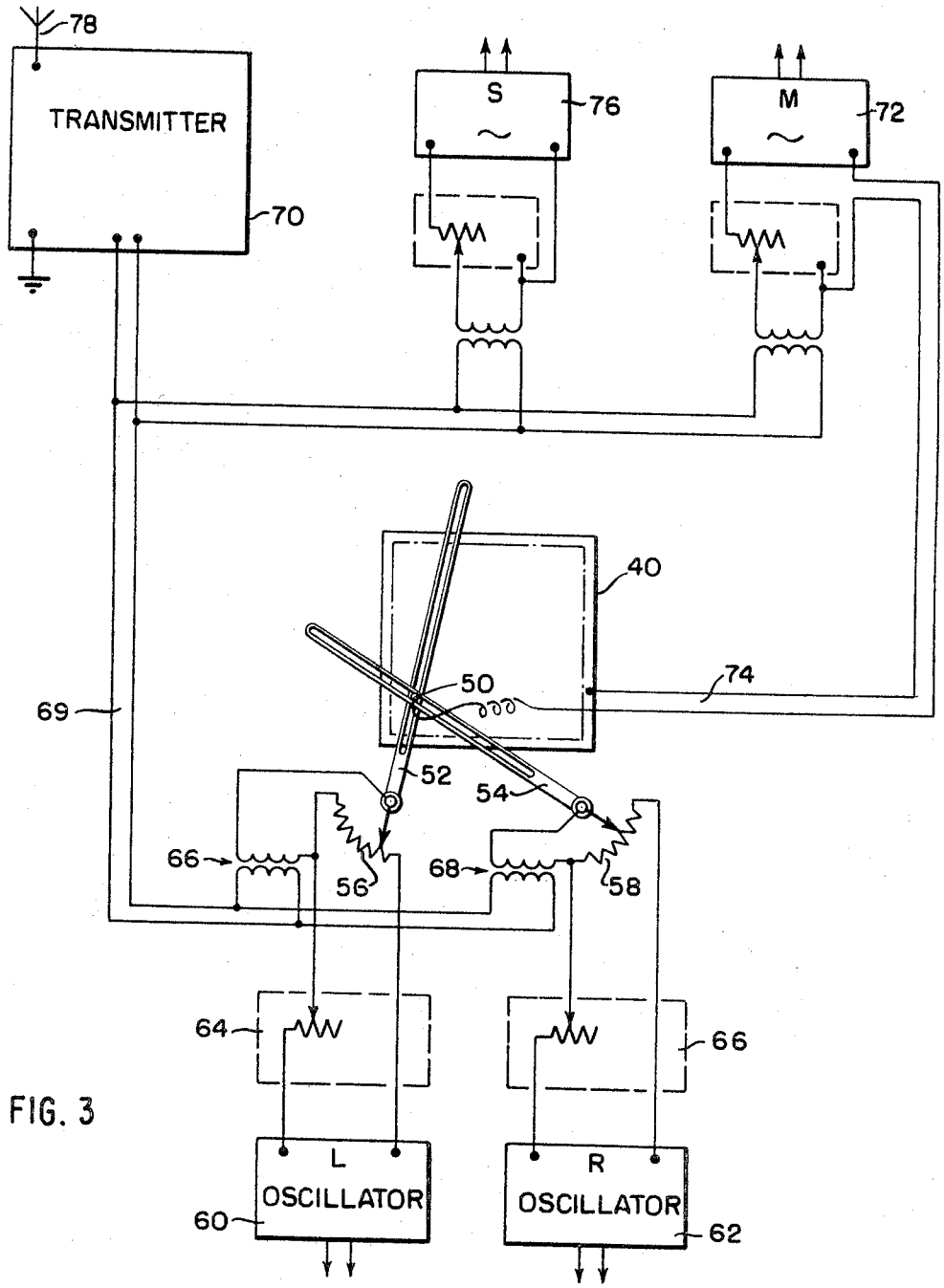
FIG. 3 is a schematic diagram of a transmitting system useful with the present invention.

Although the meter units 29 and 31 may be actuated, and the spark may be controlled, by any suitable signals, as by signals transmitted over wires, the preferred system involves radio transmission. For this purpose a transmitter-transducer is shown diagrammatically in FIG. 3, and the receiver circuitry is shown schematically in FIG. 4.

At the transmitter there is a metal writing platen 40 over which a suitable marking stylus 50 may be moved, and electrical contact with the platen be made, the stylus being connected by arms 52 and 54 with the movable arms of left and right potentiometers 56 and 58. The arms 52 and 54 may take the form of any suitable linkages in the "Telautograph" art, and are here shown as pivoted arms with longitudinal slits, the stylus being received at their intersection, so that motion of the stylus causes motions of the arms about their pivots.

Two fixed frequency audio frequency oscillators 60 and 62 operating at frequencies L and R in the voice range or slightly above, are connected through calibrators 64 and 66 respectively with the left and right potentiometers 56 and 58 respectively. The potentiometer outputs are connected by matching transformers 66 and 68 with the input circuit 69 of a radio transmitter 70, which may be of conventional construction. The calibrators comprise series resistors by which the amplitudes of the L and R signals may be adjusted to be equal for similar positions of the potentiometer arms.

A third fixed frequency oscillator 72 is connected to the input circuit through a switch constituted by the stylus and platen, as indicated by the circuit 74. The oscillator 72 generates a "marking" signal of frequency M which is fed into the transmitter 70 when the stylus contacts the platen and thus closes the circuit 74.

A fourth audio frequency oscillator 76 may be used to transmit a standard or reference signal of frequency S by which the amplification of the signals at the receiver may be adjusted so that the amplitudes of the L and R signals at the receiver will cause the L and R meter units to move the electrodes to the proper positions represented by the positions of the potentiometer arms at the transmitter.

The frequencies of the four signals are not critical. If the system is to be used simultaneously for recording and voice communication, the frequencies of the recording system will be above normal voice frequencies. Thus, a suitable set of frequencies is L=17,000, R=18,000, S=17,500, and M=18,500 cycles per second. If the system is to be used for recording only, L may be 9,500, R=10,500 S=10,000, M=11,000 cycles per second.

The transmitter has the necessary equipment for modulating a carrier at the four frequencies L, R, S and M (together with any voice frequencies). The modulated carrier is radiated from a transmitting antenna 78 and may be picked up by a suitable receiving antenna 80 (FIG. 4).

FIG. 4 is a schematic diagram of the recorder. The operating signals are received by the radio receiver 84, which may be any type receiver in any radio frequency range which receives voice or broadcast signals satisfactorily when tuned to the desired transmitter. The audio frequency signals from the receiver include the signals at frequencies L, R, M and S above mentioned. One of these, L passes through a narrow band pass filter $F_L$ and thence to the automatic gain control unit (AGC) where its intensity is adjusted, if need be, to bear a proper ratio to the constant "standard" signal S. This signal S at the output of the receiver passes through a narrow band pass filter $F_S$ and thence to the AGC unit where it is used as the reference or control signal of the AGC, the latter being used over radio communication channels which are subject to variable attenuation; but may be dispensed with if the communication channel has constant attenuation, as is the case with any conventional wire circuits or if the automatic volume control (AVC) of the receiver is found to hold the radio frequency signal level constant. The audio frequency tone R is filtered by $F_R$ and then passes to the AGC where its intensity is also adjusted. The fourth tone M is filtered similarly, but is rectified in the unit $F_m$ and thence goes as direct current to the relay 86 where it closes a circuit from a suitable power supply into the spark coil 38. This occurs when the stylus marks on the platen at the transmitter.

The direct current signal of variable intensity resulting from signal L at the AGC goes to the left meter unit 31 over a circuit 88. Similarly the direct current signal from the AGC resulting from signal R goes to the right galvanometer 29 over a circuit 90. The heat-sensitive paper 20 in the plane between the wire electrodes 24 and 26 receives a discoloration whenever the spark coil is activated by a marking signal M. This occurs when the stylus contacts the platen at the transmitter. When the stylus is marking the spark will be generated continuously and the record will appear as a line or a series of closely spaced dots.

It will be understood that both the potentiometers at the transmitter and the meters at the receiver should preferably have linear characteristics over the full 90° ranges of movement of the recording arms. Then the amplitudes of the signals R and L will be proportional to the angular positions of the potentiometer arms, and the angular positions of the electrodes 24 and 26 will be proportional to those signals, so that the electrodes will at each instant assume the same angular positions as the potentiometer arms, and the recorded graph will be an exact reproduction of the graph at the transmitter. However, nonlinear characteristics may be compensated for by shaping the potentiometer windings or by introducing compensating nonlinearities in the filters $F_R$ and $F_L$, as will be understood by those skilled in this art.

The recording sheet may be a heat-sensitive paper of any suitable manufacture. In general, it is desirable that the paper have low dielectric strength, and it may be perforated with pinholes uniformly spaced in the same manner as halftone dots, preferably 100 or more to the lineal inch, i.e., several thousand to the square inch, in order that the spark may pass without puncturing the paper. It has also been found that a fine woven cloth is satisfactory, since the interstices in the weave act in the manner of the perforations above mentioned; the cloth may be coated with a salt of mercury or other metal capable of causing deposition of the metal upon decomposition of the salt by the action of the spark.

Having thus described the invention, I claim:

1. Graphical recording apparatus comprising means for supporting a recording sheet, two opposed electrodes, one supported above and the other below the sheet, each of said electrodes comprising a wire, means for supporting and tensioning each wire, means for mounting the electrodes for rotation about two centers so disposed that the intersection of the projection of said electrodes can occur at any point of the sheet, operating means for independently rotating said electrodes in accordance with incoming signals, and electrical discharge means for marking the sheet at said intersection.

2. Graphical recording apparatus according to claim 1, in which the supporting and tensioning means for the wires lie below the recording sheet whereby the viewing surface is obscured only by the wire above the sheet.

3. Graphical recording apparatus according to claim 1, in which said recording sheet is passed in a lower stretch and an upper stretch disposed thereabove, and the supporting and tensioning means for the lower wire is disposed between said stretches, and the supporting and tensioning means for the upper wire is disposed below both of said stretches.

4. Graphical recording apparatus according to claim 3, in which the supporting and tensioning means for each wire comprises a spring bow.

5. Graphical recording apparatus according to claim 1, in which said operating means comprise meters of the D'Arsonval type.

6. Graphical recording apparatus according to claim 5, said meters being disposed near adjacent corners of the sheet.

7. Graphical recording apparatus according to claim 1, together with circuits for said operating means, said circuits including filter circuits having pass bands at different frequencies for energizing said operating means.

8. Graphical recording apparatus according to claim 7, together with a discharge control circuit including a filter, a voltage source, and means operated by the discharge control circuit to apply the voltage from said source to the electrodes to mark the sheet.

9. Graphical recording apparatus according to claim 5, together with a discharge control circuit including a filter, a voltage source, and means operated by the discharge control circuit to apply the voltage from said source to the electrodes to mark the sheet.

10. Graphical recording apparatus according to claim 1, in which said recording sheet comprises a paper recording medium having several thousand uniformly spaced pinhole perforations per square inch.

References Cited

UNITED STATES PATENTS

| | | |
|---|---|---|
| 1,901,921 | 3/1933 | Means. |
| 2,274,638 | 3/1942 | Rosene. |
| 2,876,060 | 3/1959 | Chambers. |

THOMAS A. ROBINSON, *Primary Examiner.*

U.S. Cl. X.R.

178—94; 346—74, 76